(12) United States Patent
Iwasaki et al.

(10) Patent No.: US 10,379,477 B2
(45) Date of Patent: Aug. 13, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Ryohei Iwasaki, Kanagawa (JP); Shinichi Takahashi, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 475 days.

(21) Appl. No.: 14/820,733

(22) Filed: Aug. 7, 2015

(65) Prior Publication Data

US 2016/0216175 A1    Jul. 28, 2016

(30) Foreign Application Priority Data

Jan. 27, 2015    (JP) .................... 2015-013660

(51) Int. Cl.
| | |
|---|---|
| *G06F 11/30* | (2006.01) |
| *G21C 17/00* | (2006.01) |
| *G03G 15/00* | (2006.01) |
| *G06F 11/00* | (2006.01) |
| *G05B 23/02* | (2006.01) |

(52) U.S. Cl.
CPC ..... *G03G 15/5075* (2013.01); *G05B 23/0272* (2013.01); *G06F 11/008* (2013.01); *G05B 2219/45188* (2013.01)

(58) Field of Classification Search
None
See application file for complete search history.

(56) References Cited

U.S. PATENT DOCUMENTS

| | | | | |
|---|---|---|---|---|
| 2002/0184568 A1* | 12/2002 | Kurrasch | ............ | G06F 11/0748 714/39 |
| 2005/0262394 A1* | 11/2005 | Yasukawa | ........... | G06F 11/0733 714/23 |
| 2011/0157624 A1 | 6/2011 | Nishikawa | | |
| 2012/0099877 A1 | 4/2012 | Funatsu | | |
| 2014/0278070 A1* | 9/2014 | McGavran | ............ | G01C 21/00 701/465 |
| 2015/0025924 A1* | 1/2015 | Yun | ........................ | G06Q 10/00 705/7.11 |

FOREIGN PATENT DOCUMENTS

| | | |
|---|---|---|
| JP | 2008287501 A | 11/2008 |
| JP | 2011-113229 A | 6/2011 |
| JP | 2011131510 A | 7/2011 |
| JP | 2011141797 A | 7/2011 |
| JP | 201288649 A | 5/2012 |

OTHER PUBLICATIONS

Communication dated May 31, 2016 issued by the Japanese Patent Office in counterpart application No. 2015-146983.
Communication dated Sep. 27, 2016, issued by the Japan Patent Office in corresponding Japanese Application No. 2015-146983.

* cited by examiner

*Primary Examiner* — Calvin Y Choi
(74) *Attorney, Agent, or Firm* — Sughrue Mion, PLLC

(57) ABSTRACT

An information processing apparatus includes an acquisition unit, a classification unit, a calculation unit, and a notification unit. The acquisition unit acquires history information and attribute information on plural apparatuses. The classification unit classifies the apparatuses into plural categories in accordance with the attribute information on the apparatuses. The calculation unit calculates degrees of occurrence of malfunctions for apparatuses of the categories in accordance with the acquired history information, the degrees of occurrence of malfunctions being calculated for the respective categories, into which classification has been performed. The notification unit notifies an apparatus of a possibility of occurrence of malfunctions, the apparatus belonging to a category for which the calculated degree of occurrence of malfunctions for an apparatus exceeds a threshold.

2 Claims, 16 Drawing Sheets

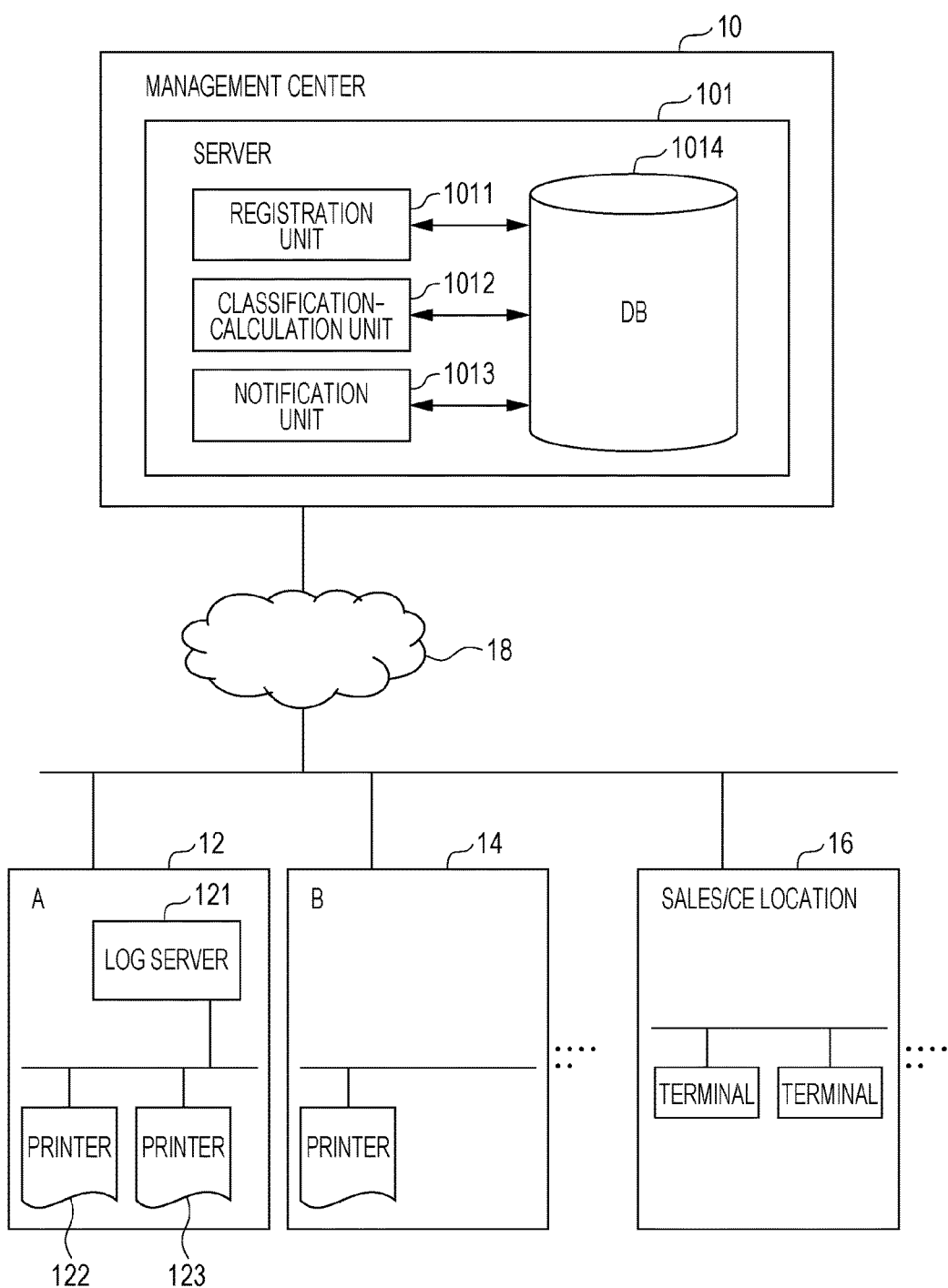

FIG. 2

```
CUSTOMER NAME ZZZ (EMAIL-ADDRESS INFORMATION: XXXXX)
APPARATUS 000001
```

| | |
|---|---|
| APPARATUS INSTALLATION | |
|   INPUT BY | CE (1) |
|   DATE AND TIME | 2XXXX/XX/XX |
|   LOCATION | (ADDRESS) |
|   INSTALLATION ENVIRONMENT | NO CLEAN ROOM |
|   TYPE OF INDUSTRY | NEWSPAPER |
|   NUMBER OF PAGES FOR APPARATUS | — |
|   NUMBER OF PRINTED SHEETS (ESTIMATED) | ABOUT ○○ PAGES/DAY |
|   ・・・・・ | |
| ・・・・・ | |
| MAINTENANCE OPERATION | |
|   INPUT BY | CE (1) |
|   DATE AND TIME | 2XXXX/XX/XX |
|   ERROR DESCRIPTION | NOTIFICATION OF PHOTOCONDUCTOR DRUM REPLACEMENT |
|   DETAILS OF OPERATION | PHOTOCONDUCTOR DRUM REPLACEMENT |
|   NUMBER OF PAGES FOR APPARATUS | — |
|   ・・・・・ | |
| ・・・・・ | |
| MAINTENANCE OPERATION | |
|   INPUT BY | CE (2) |
|   DATE AND TIME | 2XXXX/XX/XX |
|   ERROR DESCRIPTION | NOTIFICATION OF PHOTOCONDUCTOR DRUM REPLACEMENT |
|   DETAILS OF OPERATION | PHOTOCONDUCTOR DRUM REPLACEMENT |
|   NUMBER OF PAGES FOR APPARATUS | |
|   ・・・・・ | |
| ・・・・・ | |

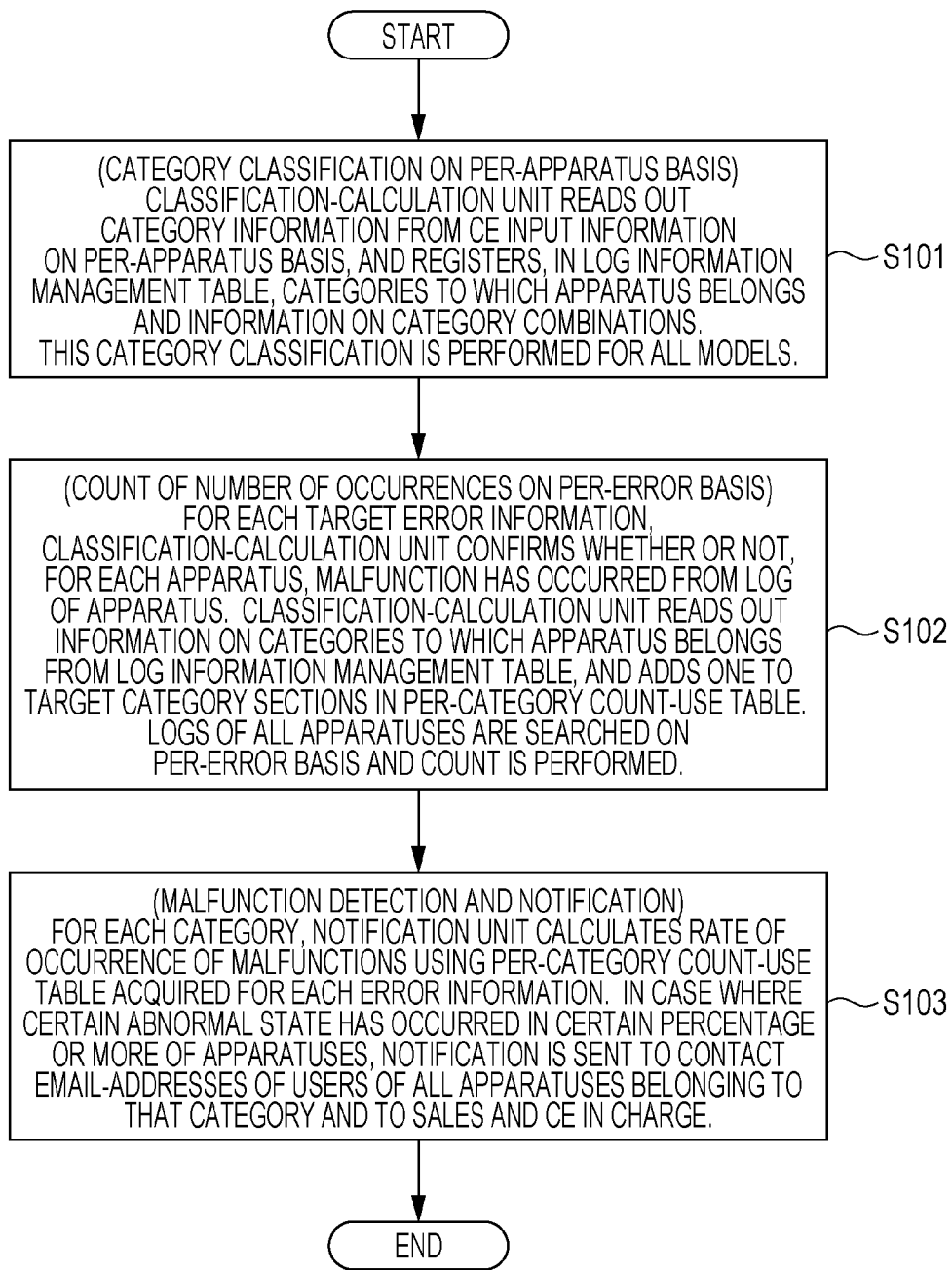

FIG. 5

| | REGISTRATION LOCATION OF LOG INFORMATION AND SALES/CE'S INPUTS | LOG FILE NAME | SALES/CE INPUT FILE NAME | INFORMATION ON CATEGORIES (REGION, CLEAN ROOM, TYPE OF INDUSTRY, NUMBER OF PRINTED SHEETS) |
|---|---|---|---|---|
| APPARATUS 000001 | /XXXXX/XXXXX/ APPARATUS000001/ | LOG_ XXXXX | MENTENANCE_ LOG_XXXXX | JAPAN A, CLEAN ROOM AVAILABLE, NEWSPAPER, PRINTING LARGE NUMBER OF PAGES<br>JAPAN A & CLEAN ROOM AVAILABLE<br>JAPAN A & NEWSPAPER<br>JAPAN A & PRINTING LARGE NUMBER OF PAGES<br>CLEAN ROOM AVAILABLE & NEWSPAPER<br>CLEAN ROOM AVAILABLE & PRINTING LARGE NUMBER OF PAGES<br>NEWSPAPER & PRINTING LARGE NUMBER OF PAGES<br>JAPAN A & CLEAN ROOM AVAILABLE & NEWSPAPER<br>JAPAN A & CLEAN ROOM AVAILABLE & PRINTING LARGE NUMBER OF PAGES<br>JAPAN A & NEWSPAPER & PRINTING LARGE NUMBER OF PAGES<br>CLEAN ROOM AVAILABLE & NEWSPAPER & PRINTING LARGE NUMBER OF PAGES<br>JAPAN A & CLEAN ROOM AVAILABLE & NEWSPAPER & PRINTING LARGE NUMBER OF PAGES |
| APPARATUS 000002 | /XXXXX/XXXXX/ APPARATUS000002/ | LOG_ XXXXX | MENTENANCE_ LOG_XXXXX | JAPAN B, CLEAN ROOM AVAILABLE, PAMPHLET, #2 PRINTING LARGE NUMBER OF PAGES OCCASIONALLY<br>JAPAN B & CLEAN ROOM AVAILABLE<br>JAPAN B & PAMPHLET<br>JAPAN B & #2 PRINTING LARGE NUMBER OF PAGES OCCASIONALLY<br>CLEAN ROOM AVAILABLE & PAMPHLET<br>CLEAN ROOM AVAILABLE & #2 PRINTING LARGE NUMBER OF PAGES OCCASIONALLY<br>PAMPHLET & #2 PRINTING LARGE NUMBER OF PAGES OCCASIONALLY<br>JAPAN B & CLEAN ROOM AVAILABLE & PAMPHLET<br>JAPAN B & CLEAN ROOM AVAILABLE & #2 PRINTING LARGE NUMBER OF PAGES OCCASIONALLY<br>JAPAN B & PAMPHLET & #2 PRINTING LARGE NUMBER OF PAGES OCCASIONALLY<br>CLEAN ROOM AVAILABLE & PAMPHLET & #2 PRINTING LARGE NUMBER OF PAGES OCCASIONALLY<br>JAPAN B & CLEAN ROOM AVAILABLE & PAMPHLET & #2 PRINTING LARGE NUMBER OF PAGES OCCASIONALLY |
| APPARATUS 000003 | ... | ... | ... | ... |
| APPARATUS 000004 | ... | ... | ... | ... |
| APPARATUS 000005 | ... | ... | ... | ... |
| ... | ... | ... | ... | ... |

FIG. 6

| ALL COMBINATIONS OF ELEMENTS | NUMBER OF CATEGORY TARGET APPARATUSES | NUMBER OF APPARATUSES FOR WHICH MALFUNCTIONS HAVE BEEN DETECTED |
|---|---|---|
| JAPAN A<br>JAPAN B<br>...<br>INDIA A<br>INDIA B | ooooo<br>ooooo | ooooo<br>ooooo |
| CLEAN ROOM AVAILABLE<br>NO CLEAN ROOM<br>NEWSPAPER<br>DOCUMENT<br>PAMPHLET<br>... | ooooo | ooooo |
| LARGE AMOUNT OF PAGES<br>#1 OCCASIONALLY LARGE AMOUNT OF PAGES<br>#2 OCCASIONALLY LARGE AMOUNT OF PAGES<br>OTHERS | ooooo | ooooo |
| JAPAN A    CLEAN ROOM AVAILABLE<br>JAPAN A    NO CLEAN ROOM<br>JAPAN B    CLEAN ROOM AVAILABLE<br>JAPAN B    NO CLEAN ROOM<br>... | ooooo | ooooo |
| JAPAN A    NEWSPAPER<br>JAPAN A    DOCUMENT<br>JAPAN A    PAMPHLET<br>... | ooooo | ooooo |
| JAPAN A    CLEAN ROOM AVAILABLE    NEWSPAPER<br>JAPAN A    CLEAN ROOM AVAILABLE    DOCUMENT<br>JAPAN A    CLEAN ROOM AVAILABLE    PAMPHLET<br>JAPAN A    CLEAN ROOM AVAILABLE    ... | ooooo | ooooo |
| JAPAN A    CLEAN ROOM AVAILABLE    NEWSPAPER    LARGE AMOUNT OF PAGES<br>JAPAN A    CLEAN ROOM AVAILABLE    NEWSPAPER    #1 OCCASIONALLY LARGE AMOUNT OF PAGES<br>JAPAN A    CLEAN ROOM AVAILABLE    NEWSPAPER    #2 OCCASIONALLY LARGE AMOUNT OF PAGES<br>JAPAN A    CLEAN ROOM AVAILABLE    NEWSPAPER    OTHERS<br>... | ooooo | ooooo |

FIG. 9

| | | JAPAN A REGION | | JAPAN B REGION | | INDIA A REGION | | ... | JAPAN A ONLY | JAPAN B ONLY | INDIA A REGION ONLY | ... | CLEAN ROOM AVAILABLE ONLY | NO CLEAN ROOM ONLY | ENTIRETY |
|---|---|---|---|---|---|---|---|---|---|---|---|---|---|---|---|
| | | CLEAN ROOM AVAILABLE | NO CLEAN ROOM | CLEAN ROOM AVAILABLE | NO CLEAN ROOM | CLEAN ROOM AVAILABLE | NO CLEAN ROOM | | | | | | | | |
| NEWSPAPER | LARGE AMOUNT OF PAGES | 0 | 2 | 0 | 15 | 0 | 17 | | 1 | 8 | 9 | | 0 | 11 | 6 |
| | #1 OCCASIONALLY LARGE AMOUNT OF PAGES | 0 | 3 | 0 | 20 | 0 | 20 | | 2 | 10 | 10 | | 0 | 14 | 7 |
| | #2 OCCASIONALLY LARGE AMOUNT OF PAGES | 0 | 1 | 0 | 15 | 0 | 30 | | 1 | 8 | 15 | | 0 | 15 | 8 |
| | OTHERS | 0 | 0 | 0 | 21 | 0 | 25 | | 0 | 11 | 13 | | 0 | 15 | 8 |
| DOCUMENT | LARGE AMOUNT OF PAGES | 0 | 0 | 0 | 16 | 0 | 5 | | 0 | 8 | 3 | | 0 | 7 | 4 |
| | #1 OCCASIONALLY LARGE AMOUNT OF PAGES | 0 | 1 | 0 | 25 | 0 | 10 | | 1 | 13 | 5 | | 0 | 12 | 6 |
| | #2 OCCASIONALLY LARGE AMOUNT OF PAGES | 0 | 2 | 0 | 18 | 0 | 10 | | 1 | 9 | 5 | | 0 | 10 | 5 |
| | OTHERS | 0 | 1 | 0 | 10 | 0 | 7 | | 1 | 5 | 4 | | 0 | 6 | 3 |
| PAMPHLET | LARGE AMOUNT OF PAGES | 0 | 3 | 2 | 14 | 1 | 35 | | 2 | 8 | 18 | | 1 | 17 | 9 |
| | #1 OCCASIONALLY LARGE AMOUNT OF PAGES | 1 | 4 | 0 | 16 | 0 | 30 | | 3 | 8 | 15 | | 0 | 17 | 9 |
| | #2 OCCASIONALLY LARGE AMOUNT OF PAGES | 0 | 4 | 0 | 15 | 0 | 30 | | 2 | 8 | 15 | | 0 | 16 | 8 |
| | OTHERS | 0 | 0 | 0 | 10 | 0 | 20 | | 0 | 5 | 10 | | 0 | 10 | 5 |
| LARGE AMOUNT OF PAGES ONLY | | 0 | 2 | 1 | 15 | 0 | 19 | | 1 | 8 | 10 | | 0 | 12 | 6 |
| #1 OCCASIONALLY LARGE AMOUNT OF PAGES ONLY | | 0 | 3 | 0 | 20 | 0 | 20 | | 2 | 10 | 10 | | 0 | 14 | 7 |
| #2 OCCASIONALLY LARGE AMOUNT OF PAGES ONLY | | 0 | 2 | 1 | 16 | 0 | 23 | | 1 | 8 | 12 | | 0 | 14 | 7 |
| OTHERS ONLY | | 0 | 0 | 0 | 14 | 0 | 17 | | 0 | 7 | 9 | | 0 | 10 | 5 |
| NEWSPAPER ONLY | | 0 | 2 | 0 | 18 | 0 | 23 | | 1 | 9 | 12 | | 0 | 14 | 7 |
| DOCUMENT ONLY | | 0 | 1 | 1 | 17 | 0 | 8 | | 1 | 9 | 4 | | 0 | 9 | 4 |
| OTHERS ONLY | | 0 | 3 | 0 | 14 | 0 | 29 | | 2 | 7 | 15 | | 0 | 15 | 8 |
| ENTIRETY | | 0 | 2 | 0 | 16 | 0 | 20 | | 1 | 8 | 10 | | 0 | 13 | 6 |

SEND NOTIFICATION

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-013660 filed Jan. 27, 2015.

BACKGROUND (i) Technical Field

The present invention relates to an information processing apparatus and a non-transitory computer readable medium.

(ii) Related Art

Hitherto, a technology for anticipating an abnormal state in a printer or the like has been proposed. The basics of technologies for anticipation are collection of histories (logs) of apparatuses and determination as to whether or not the state of an apparatus becomes closer to a malfunction level by analyzing these histories (logs).

SUMMARY

According to an aspect of the invention, there is provided an information processing apparatus including an acquisition unit, a classification unit, a calculation unit, and a notification unit. The acquisition unit acquires history information and attribute information on plural apparatuses. The classification unit classifies the apparatuses into plural categories in accordance with the attribute information on the apparatuses. The calculation unit calculates degrees of occurrence of malfunctions for apparatuses of the categories in accordance with the acquired history information, the degrees of occurrence of malfunctions being calculated for the respective categories, into which classification has been performed. The notification unit notifies an apparatus of a possibility of occurrence of malfunctions, the apparatus belonging to a category for which the calculated degree of occurrence of malfunctions for an apparatus exceeds a threshold.

BRIEF DESCRIPTION OF THE DRAWINGS

An exemplary embodiment of the present invention will be described in detail based on the following figures, wherein:

FIG. 1 is a system configuration diagram of an exemplary embodiment;

FIG. 2 is an illustrative diagram illustrating an example of sales/CE input information;

FIG. 3 is a flowchart of the entire process of a management server;

FIG. 5 is an illustrative diagram illustrating an example of a log information management table.

FIG. 6 is an illustrative diagram illustrating an example of a per-category count-use table.

FIG. 9 is an illustrative diagram illustrating an example of the rates of occurrence of malfunctions for respective categories.

DETAILED DESCRIPTION

Figure 4:
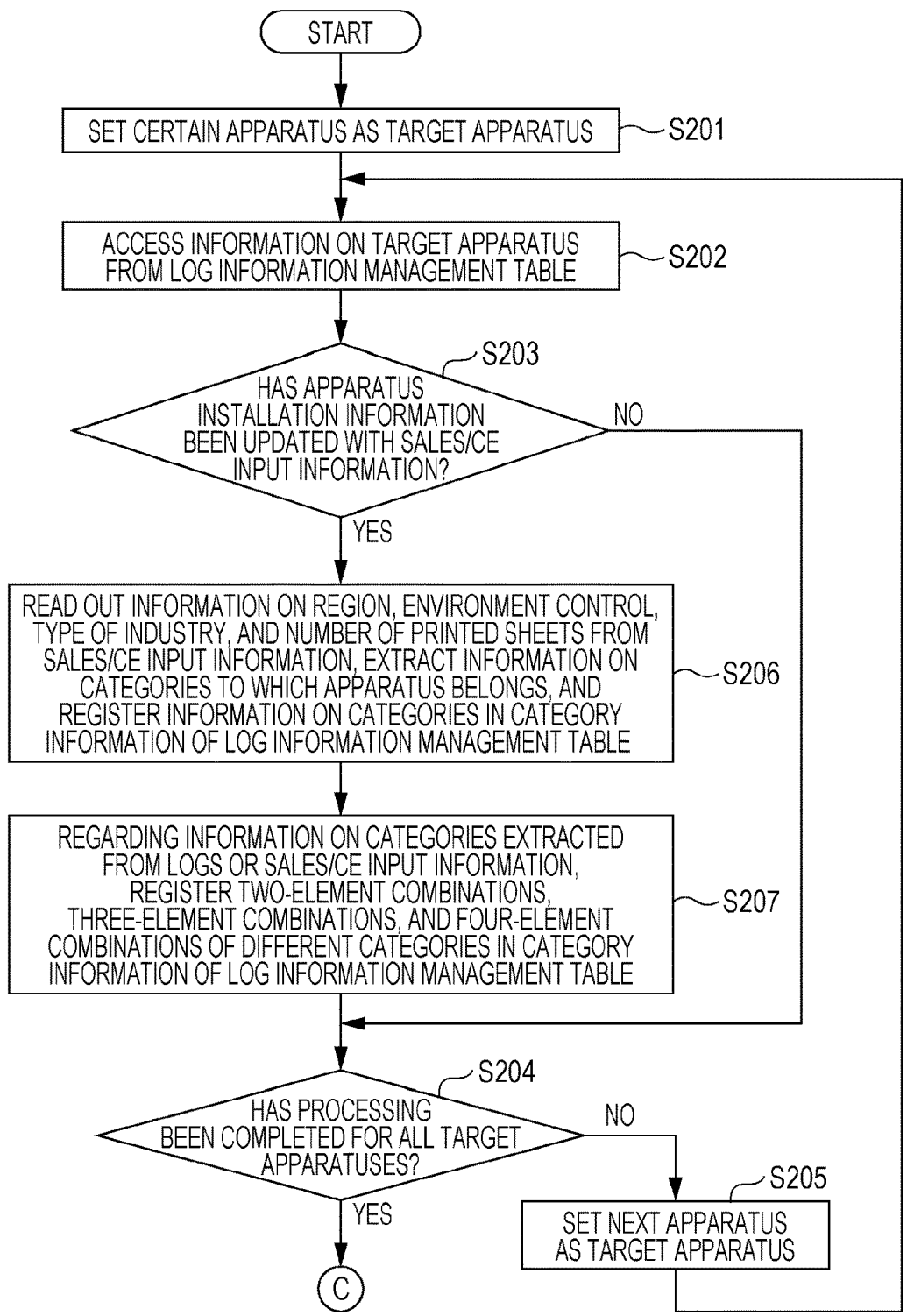
FIG. 4 is a detailed flowchart of FIG. 3.

In the following, an exemplary embodiment of the present invention will be described with reference to the drawings.

FIG. 1 is a system configuration diagram of a present exemplary embodiment. This system includes a management center 10, plural customer apparatuses 12, 14, and so on, and a sales/customer engineer (CE) location apparatus 16, which are connected to one another via the Internet 18.

The management center 10 includes a management server 101. The management server 101 collects history (log) information on printers from the customer apparatuses 12, 14, and so on, and the sales/CE location apparatus 16 via the Internet 18.

The customer apparatus 12 includes a log server 121, and plural printers 122, 123, and so on. The log server 121 collects history (log) information on the printers 122, 123, and so on, and periodically transmits the collected history information to the management center 10 via the Internet 18. The same applies to the customer apparatus 14; however, depending on customers, there may be the case where only one printer is installed and there is no log server. That is, for a customer apparatus, there may be the case where one or plural printers are installed and a log server is present or no log server is present. The history (log) information on the printer 122 includes an operation status of the printer 122 and error information on the printer 122. The same applies to the printer 123. In the case where there is no log server, history information may be directly transmitted to the management center 10 from printers via the Internet 18.

The sales/CE location apparatus 16 includes plural terminals, and stores information on the printers 122, 123, and so on of the customer apparatuses 12, 14, and so on. The terminals of the sales/CE location apparatus 16 transmit the information on the printers 122, 123, and so on to the management center 10 via the Internet 18. The information on the printers 122, 123, and so on is attribute information such as the installation locations and environments of the printers, the types of industry of users (customers) who use the printers, and the like. Note that in the case where there is information such as error information or error action information on the printers 122, 123, and so on, the information is also stored whenever necessary and is transmitted to the management center 10.

The management server 101 of the management center 10 includes a registration unit 1011, a classification-calculation unit 1012, a notification unit 1013, and a database (DB) 1014 as functional blocks. The registration unit 1011 acquires the history (log) information and attribute information on the printers, and registers the history (log) information and the attribute information in the DB 1014 such that the history (log) information and the attribute information are associated with each other. That is, the history information on the printers 122, 123, and so on received from the log server 121 is associated with the attribute information on the printers 122, 123, and so on received from the terminals of the sales/CE location apparatus 16 on a per-printer basis. For example, regarding the printer 122, history information including error information and received from the log server 121 is associated with attribute information received from a certain terminal of the sales/CE location apparatus 16. The attribute information (the installation location and the installation environment, the type of industry of the user, and the number of printed sheets) and the history information (error information) on the printer 122 are associated with each other and registered in the database 1014. Error information may also include an error type and its action method, and the error action method may also be transmitted from a certain terminal of the sales/CE location apparatus 16 as attribute information. The number of printed sheets is basically transmitted from the log server 121 as history information; however, when the sales/CE location apparatus 16 knows the number of printed sheets, the number of printed sheets may also be transmitted from the sales/CE location apparatus 16 as attribute information.

The classification-calculation unit 1012 classifies the printers into plural categories in accordance with the attribute information registered in the DB 1014. In addition, for each of the plural categories, the classification-calculation unit 1012 calculates the degree of occurrence of malfunctions in accordance with the history information registered in the DB 1014. The classification-calculation unit 1012 registers the calculated degrees of occurrence of malfunctions on a per-category basis in the DB 1014. For each of the plural categories, the notification unit 1013 notifies printers of the possibility of occurrence of malfunctions, the printers belonging to the category, via the Internet 18 in accordance with the degree of occurrence of malfunctions calculated by the classification-calculation unit 1012.

In the present exemplary embodiment, the degrees of occurrence of malfunctions are calculated for respective categories from history information. Thus, even for printers newly installed or for printers that have not yet tended toward an abnormal state, if such a printer belongs to one of the categories, it is considered that the printer has the degree of occurrence of malfunctions of the category and the printer may be notified of the possibility of occurrence of malfunctions. The same applies to the cases where states in which malfunctions occur change or conditions under which malfunctions occur change for reasons that are not yet clear.

Each of the functional blocks of the management server 101 is realized by a CPU reading out processing programs stored in a program memory and executing the processing programs successively. The functional blocks are, that is, a function through which the attribute information and history information on the printers are acquired, a function through which the attribute information and the history information are associated with each other and registered in the DB 1014, a function through which classification into categories is performed, a function through which the degrees of occurrence of malfunctions are calculated for respective categories, and a function through which printers belonging to the same category are notified of the possibility of occurrence of malfunctions in accordance with the degree of occurrence of malfunctions. As a matter of course, at least either of the functions may also be realized using a hardware device such as an ASIC.

Here, the present exemplary embodiment has a configuration with which the history information on the printers 122, 123, and so on is transmitted from the log server 121 of the customer apparatuses 12, 14, and so on to the management server 101 of the management center 10. However, the log server 121 may send the log information to the sales/CE location apparatus 16, and the attribute information and the history information may be transmitted to the management server 101 in a collective manner from the sales/CE location apparatus 16.

FIG. 2 is an example of information input using the sales/CE location apparatus 16. On a per-customer-name basis and on a per-printer basis, pieces of information are successively input on a time-series basis (pieces of information are successively added from the top toward the bottom in FIG. 2). The information starts with the person who have installed the printer, the date and time, the location, the installation environment, the type of industry, the number of pages for the apparatus, and the number of printed sheets (estimated). When a maintenance operation is performed, information on the person who has performed maintenance, the date and time, an error description, the details of an operation, and the number of pages for the apparatus is input. In FIG. 2, error descriptions indicate that photoconductor drums are approaching replacement time and the details of operations indicate that the photoconductor drums have been replaced.

FIG. 3 is a flowchart of the entire process of the present exemplary embodiment. The process of the present exemplary embodiment is roughly made of three steps.

The first step is a category classification step performed on a per-printer basis (S101). In this step, for each printer, the classification-calculation unit 1012 of the management center 10 reads out category information from the information input by CEs (hereinafter referred to as CE input information) (see FIG. 2) and registers categories to which the printer belongs and information on category combinations in a log information management table. This category classification step is performed for all models.

The second step is a step for counting the number of occurrences of errors on a per-error basis (S102). In this step, for each target error information, the classification-calculation unit 1012 of the management center 10 confirms whether or not, for each printer, a malfunction has occurred from the log of the printer. The classification-calculation unit 1012 reads out information on categories to which the printer belongs from the log information management table, and adds one to target category sections in a per-category count-use table. Logs of all printers are searched on a per-error basis and count is performed.

The third step is a step for malfunction detection and notification (S103). In this step, for each category, the notification unit 1013 of the management center 10 calculates the rate of occurrence of malfunctions using the per-category count-use table acquired for each error information. In the case where a certain abnormal state has occurred in a certain percentage or more of the printers, a notification is sent to contact email-addresses of users of all the printers belonging to that category and to the sales and CE in charge.

The first to third steps are performed periodically (for example, every week or every month).

On the other hand, separately from these steps, the registration unit 1011 of the management center 10 registers logs of and CE input information on the printers in the DB 1014 of the management center 10, and registers relevant information on the printer and the logs or the CE input information in the log information management table. The registration unit 1011 performs processing periodically or whenever necessary. Registration in the DB 1014 may also be performed when each printer is on standby, for example, when the printer is not performing processing such as printing. Alternatively, the log server 121 is accessed periodically, log information is acquired, and then registration in the DB 1014 may also be performed.

Next, the first to third steps will be described in detail.

FIG. 4 is a detailed flowchart of the category classification step performed on a per-printer basis.

The classification-calculation unit 1012 sets a certain apparatus as a target apparatus (S201), and accesses information on the target apparatus from the log information management table (S202).

Next, it is determined whether or not apparatus installation information has been updated with sales/CE input information (S203). In the case where the apparatus installation information has been updated (see the topmost section "apparatus installation" in FIG. 2) (YES in S203), information on the region, environment control, the type of industry, and the number of printed sheets is read out from the sales/CE input information, information on categories (hereinafter also referred to as category information) to which the apparatus belongs is extracted, and the information on categories is registered in the category information of the log information management table (S206). In addition, regarding the information on the categories extracted from the logs or sales/CE input information, two-element combinations, three-element combinations, and four-element combinations of different categories are registered in the category information of the log information management table (S207). For example, categories are region, clean room, type of industry, and number of printed sheets. In the case where the target apparatus has region: Japan A,
clean room: available,
type of industry: newspaper, and
number of printed sheets: large number of pages,
the categories to which the target apparatus belongs are individuals and combinations as follows.
(Individual Category)
Japan A
clean room available
newspaper
printing large number of pages
(Two-Element Combination)
Japan A & clean room available
Japan A & newspaper
Japan A & printing large number of pages
clean room available & newspaper
clean room available & printing large number of pages
newspaper & printing large number of pages
(Three-Element Combination)
Japan A & clean room available & newspaper
Japan A & clean room available & printing large number of pages
Japan A & newspaper & printing large number of pages
clean room available & newspaper & printing large number of pages
(Four-Element Combination)
Japan A & clean room available & newspaper & printing large number of pages In contrast, in the case where the apparatus installation information has not been updated (NO in S203) or in the case where the apparatus installation information has been updated and processing in S206 and S207 has been performed, it is determined whether or not processing has been completed for all target apparatuses (S204). In the case where processing has not yet been completed for all target apparatuses, the next apparatus is set as a target apparatus, and the process in and after S202 is repeatedly performed. In the case where processing has been completed for all target apparatuses, the process proceeds to the following process illustrated in FIG. 7.

FIG. 5 is an example of a generated log information management table. For each apparatus, corresponding log information and sales/CE input information are managed such that the log information and the sales/CE input information are associated with each other. For each apparatus, information on categories to which the apparatus belongs is managed. For example, regarding an apparatus "000001", log information, a registration location for sales/CE input information, a log file name, and a sales/CE input file name are registered. Furthermore, individual categories, and two-element, three-element, and four-element combinations are registered as category information.

FIG. 6 is an example of a per-category count-use table. Such a per-category count-use table is generated on a per-error-information basis. For each of all combinations of elements, the number of category target apparatuses and a count value indicating the number of apparatuses for which malfunctions have been detected are registered. In FIG. 6, the numbers of category target apparatuses and the numbers of apparatuses for which malfunctions have been detected are 0, which is an initial value.

Figure 7:
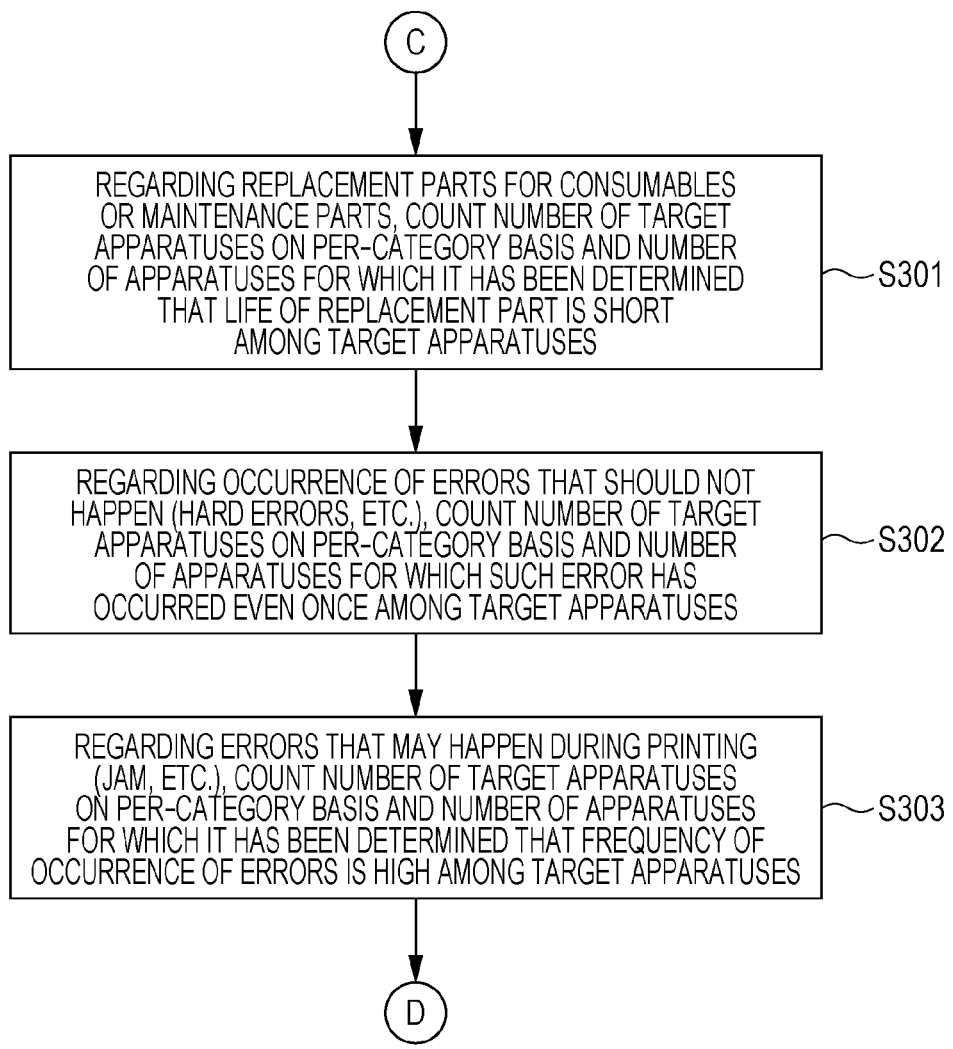
FIG. 7 is a detailed flowchart of FIG. 2.

FIG. 7 is a detailed flowchart of the step for counting the number of occurrences of errors on a per-error basis.

Regarding replacement parts for consumables or maintenance parts, the classification-calculation unit 1012 counts the number of target apparatuses on a per-category basis and the number of apparatuses for which it has been determined that the life of the replacement part is short among the target apparatuses (S301).

In addition, regarding occurrence of errors that should not happen (for example, hard errors), the classification-calculation unit 1012 counts the number of target apparatuses on a per-category basis and the number of apparatuses for which such an error has occurred even once among the target apparatuses (S302).

Furthermore, regarding errors that may happen during printing (for example, a jam), the classification-calculation unit 1012 counts the number of target apparatuses on a per-category basis and the number of apparatuses for which it has been determined that the frequency of occurrence of the errors is high among the target apparatuses (S303).

Figure 8A:
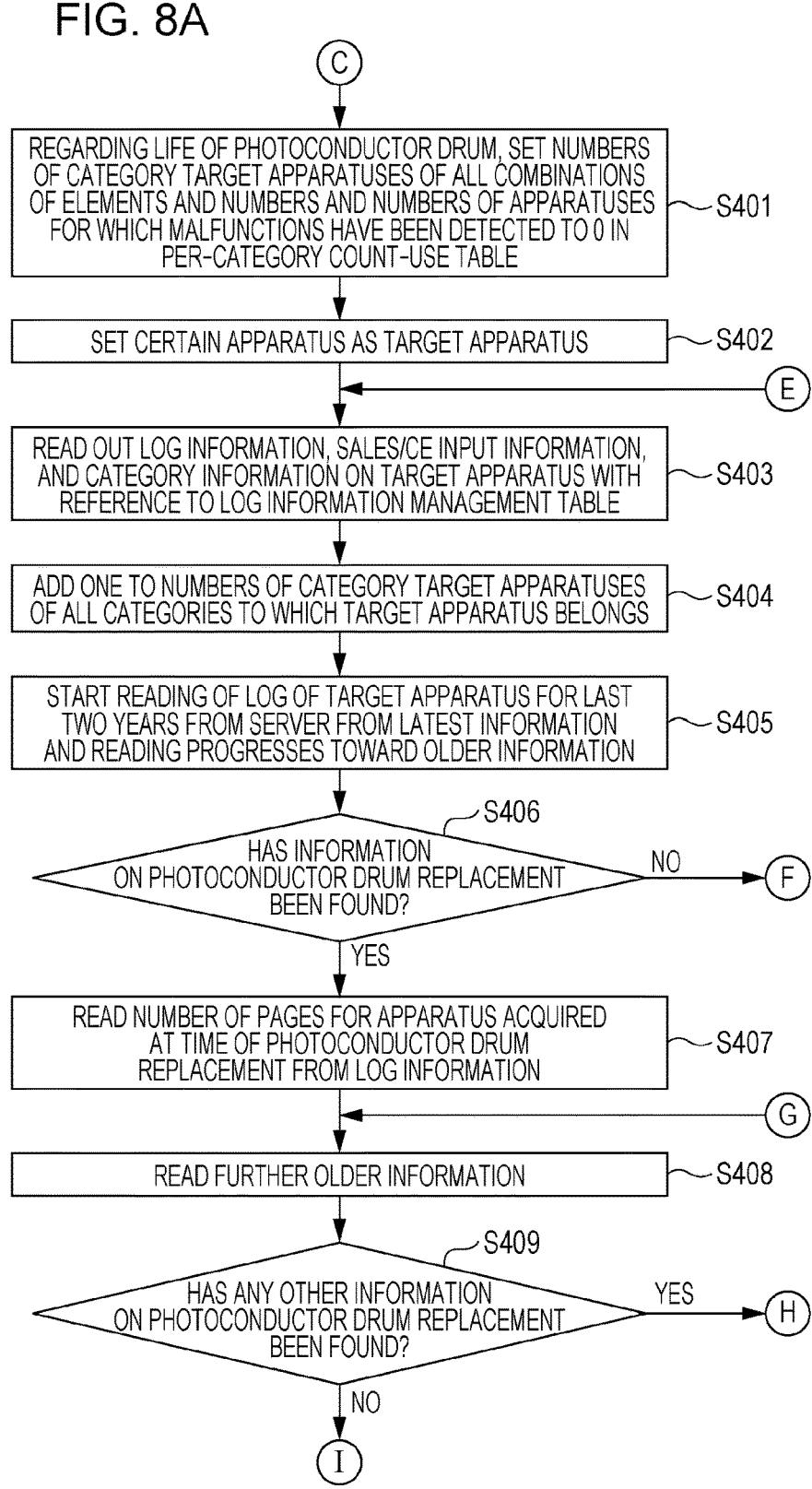
FIG. 8A is a detailed flowchart of FIG. 2.
Figure 8B:
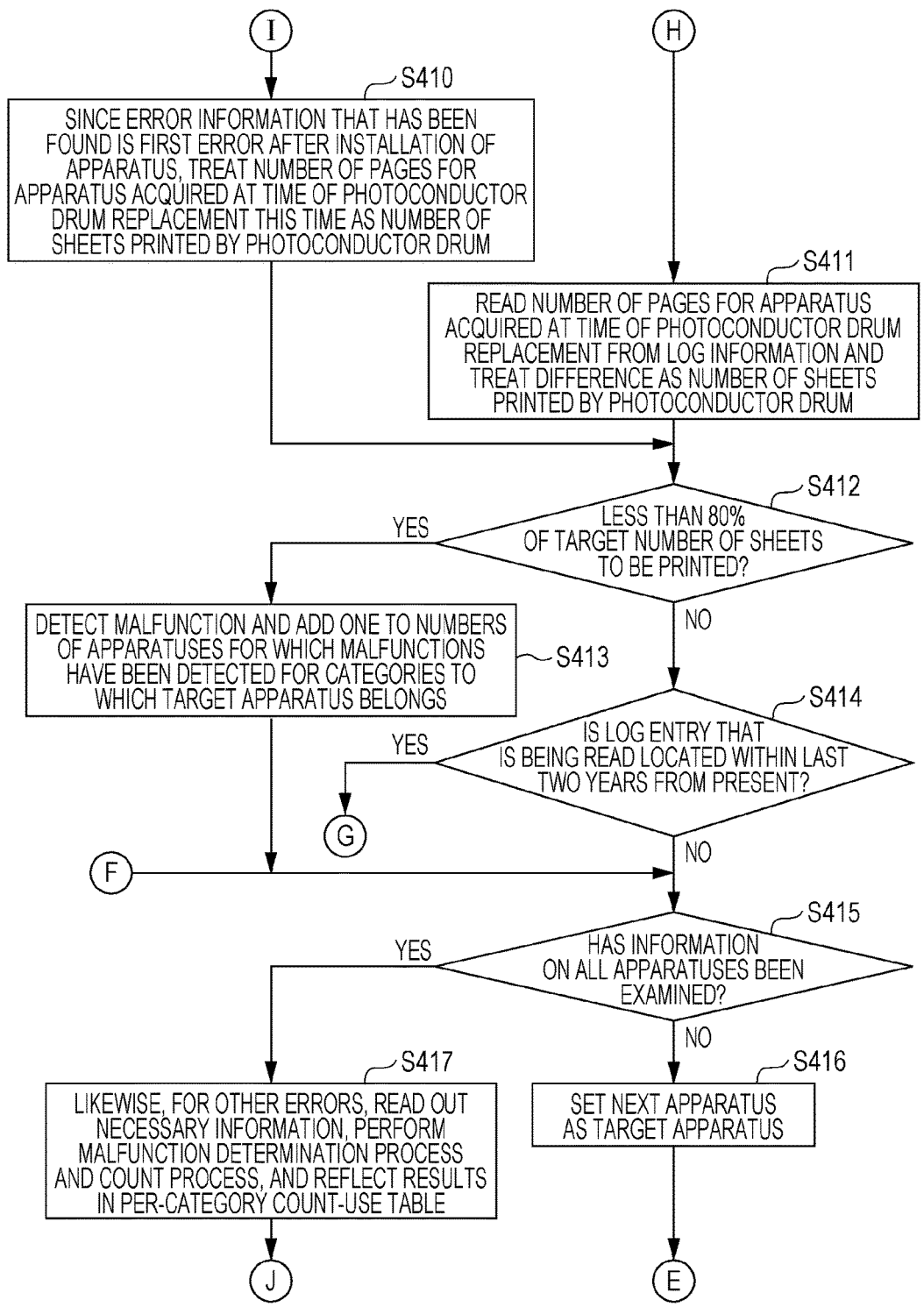
FIG. 8B is a detailed flowchart of FIG. 2.

FIG. 8A and FIG. 8B are a specific example of S301 and are a flowchart for counting the numbers of category target apparatuses of all combinations of the elements and the numbers of apparatuses for which malfunctions have been detected in the per-category count-use table.

First, regarding the life of the photoconductor drum, the classification-calculation unit 1012 initializes both the numbers of category target apparatuses of all combinations of the elements and the numbers of apparatuses for which malfunctions have been detected to 0 in the per-category count-use table (S401: see FIG. 6).

Next, a certain apparatus is set as a target apparatus (S402), log information, sales/CE input information, and category information on the target apparatus are read out with reference to the log information management table (S403), and one is added to the numbers of category target apparatuses of all categories to which the target apparatus belongs (S404).

Next, reading of a log of the target apparatus for the last certain number of years, for example, the last two years from the management server 101 is started from the latest information and progresses toward older information (S405). The reason why a period for which a log is read is limited to the last certain number of years is because a malfunction that has occurred once does not have to be counted endlessly.

Then, it is determined whether or not there is information on photoconductor drum replacement (S406). In the case where there is information on photoconductor drum replacement, the log information is searched for the number of pages for the apparatus acquired at the time of the photoconductor drum replacement and the number of pages for the apparatus is read (S407). Next, the log information is further searched and read toward the past (S408), and it is determined whether or not there is any other information on photoconductor drum replacement (S409).

In the case where there is no other information on photoconductor drum replacement (NO in S409), the process proceeds to FIG. 8B. Since error information that has been found is the first error after installation of the apparatus, the number of pages for the apparatus acquired at the time of the photoconductor drum replacement this time is treated as the number of sheets printed by the photoconductor drum (S410).

In addition, in the case where there is any other information on photoconductor drum replacement (YES in S409), the process proceeds to FIG. 8B. The number of pages for the apparatus acquired at the time of the photoconductor drum replacement is read from the log information, and the difference between the numbers of the pages for the apparatus acquired this time and the last time is treated as the number of sheets printed by the photoconductor drum (S411).

After the number of sheets printed by the photoconductor drum is set in S410 or S411, it is determined whether or not the number of sheets printed is less than 80% of the target number of sheets to be printed (S412). Here, the target number of sheets to be printed is the number of sheets to be printed and corresponding to the life of the apparatus and is a standard (or specified) number of sheets to be printed. In the case where the number of sheets printed is less than 80% of the target number of sheets to be printed, since an error has occurred because of some kind of malfunction before the number of sheets printed reaches the standard number of sheets to be printed, a malfunction is detected and one is added to the numbers of apparatuses for which malfunctions have been detected for the categories to which the target apparatus belongs (S413). Then, the process proceeds to processing in S415, which will be described later.

In contrast, in the case where the number of sheets printed is greater than or equal to 80% of the target number of sheets to be printed, a malfunction is not particularly detected, and it is determined whether or not the log entry that is being read is located within the last two years from the present (S414). In the case where the log entry is located within the last two years, the process in and after S408 of FIG. 8A is repeated. In addition, in the case where the log entry is not located within the last two years, it is determined whether or not the information on all the apparatuses has been examined (S415). In the case where the information on all the apparatuses has not yet been examined, the next apparatus is set as a target apparatus, and the process in and after S403 of FIG. 8A is repeatedly performed. In the case where the information on all the apparatuses has been examined, necessary information is likewise read out for other errors, a malfunction determination process and a count process are performed, and the results are reflected in the per-category count-use table (S417).

Figure 8C:
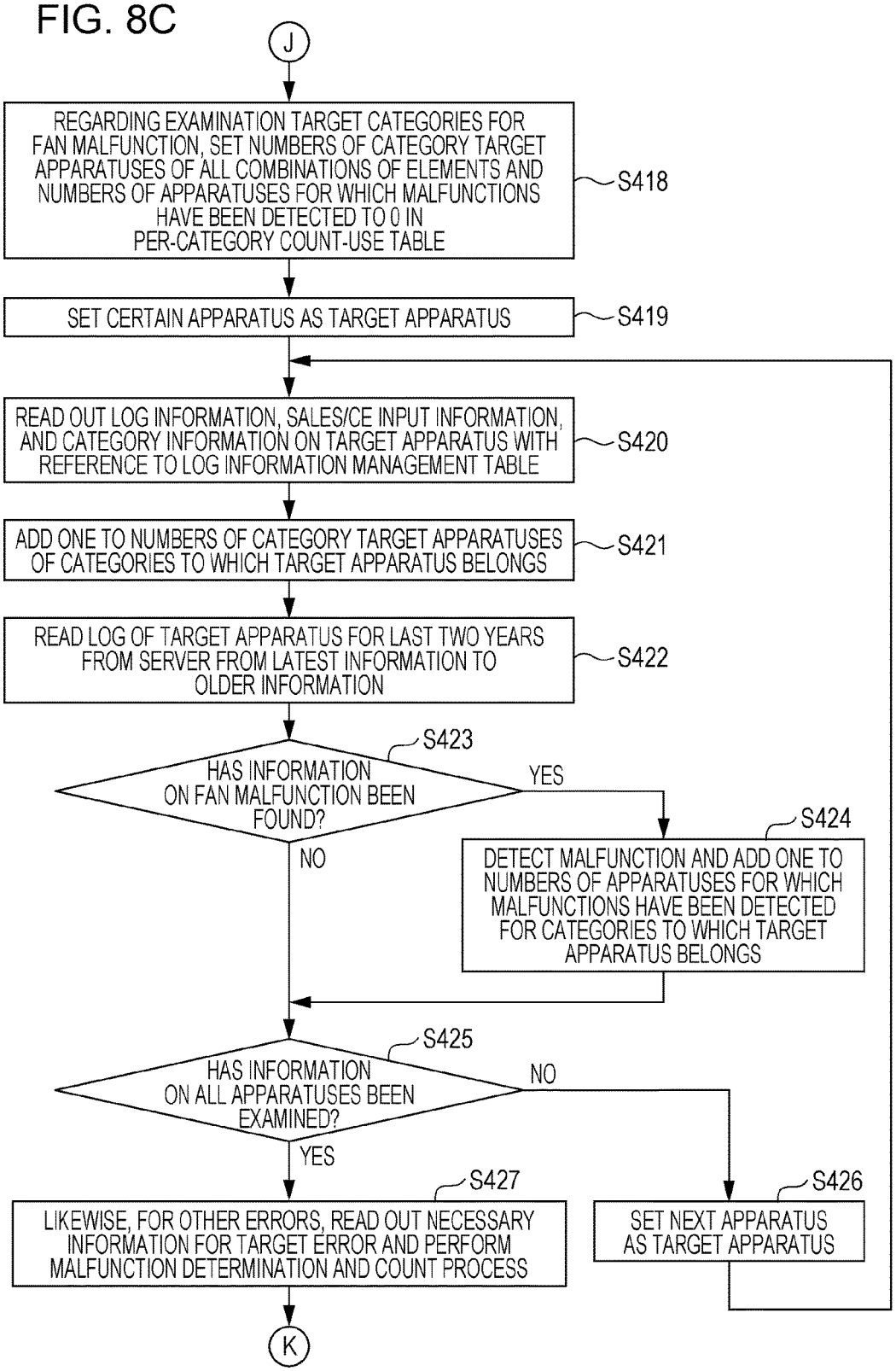
FIG. 8C is a detailed flowchart of FIG. 2.

FIG. 8C is a specific example of S302 of FIG. 7, and is a flowchart for counting the number of occurrences of a fan malfunction as a hard error.

Regarding examination target categories for a fan malfunction, the classification-calculation unit 1012 initializes the numbers of category target apparatuses of all combinations of the elements and the numbers of apparatuses for which malfunctions have been detected to 0 in the per-category count-use table (S418).

Next, a certain apparatus is set as a target apparatus (S419), log information, sales/CE input information, and category information on the target apparatus are read out with reference to the log information management table (S420), and one is added to the numbers of category target apparatuses of the categories to which the target apparatus belongs (S421).

Next, a log of the target apparatus for the last two years are read from the server from the latest information to older information (S422), and it is determined whether or not there is information on a fan malfunction (S423).

In the case where there is information on a fan malfunction, the malfunction is detected, and one is added to the numbers of apparatuses for which malfunctions have been detected for the categories to which the target apparatus belongs (S424). In the case where there is no information on a fan malfunction, one is not added to the numbers of apparatuses for which malfunctions have been detected, and it is determined whether or not the information on all the apparatuses has been examined (S425). In the case where the information on all the apparatuses has not yet been examined, the next apparatus is set as a target apparatus (S426), and the process in and after S420 is repeated. In the case where the information on all the apparatuses has been examined, for all errors, necessary information for a target error is likewise read out, and a malfunction determination and a count process are performed (S427).

Figure 8D:
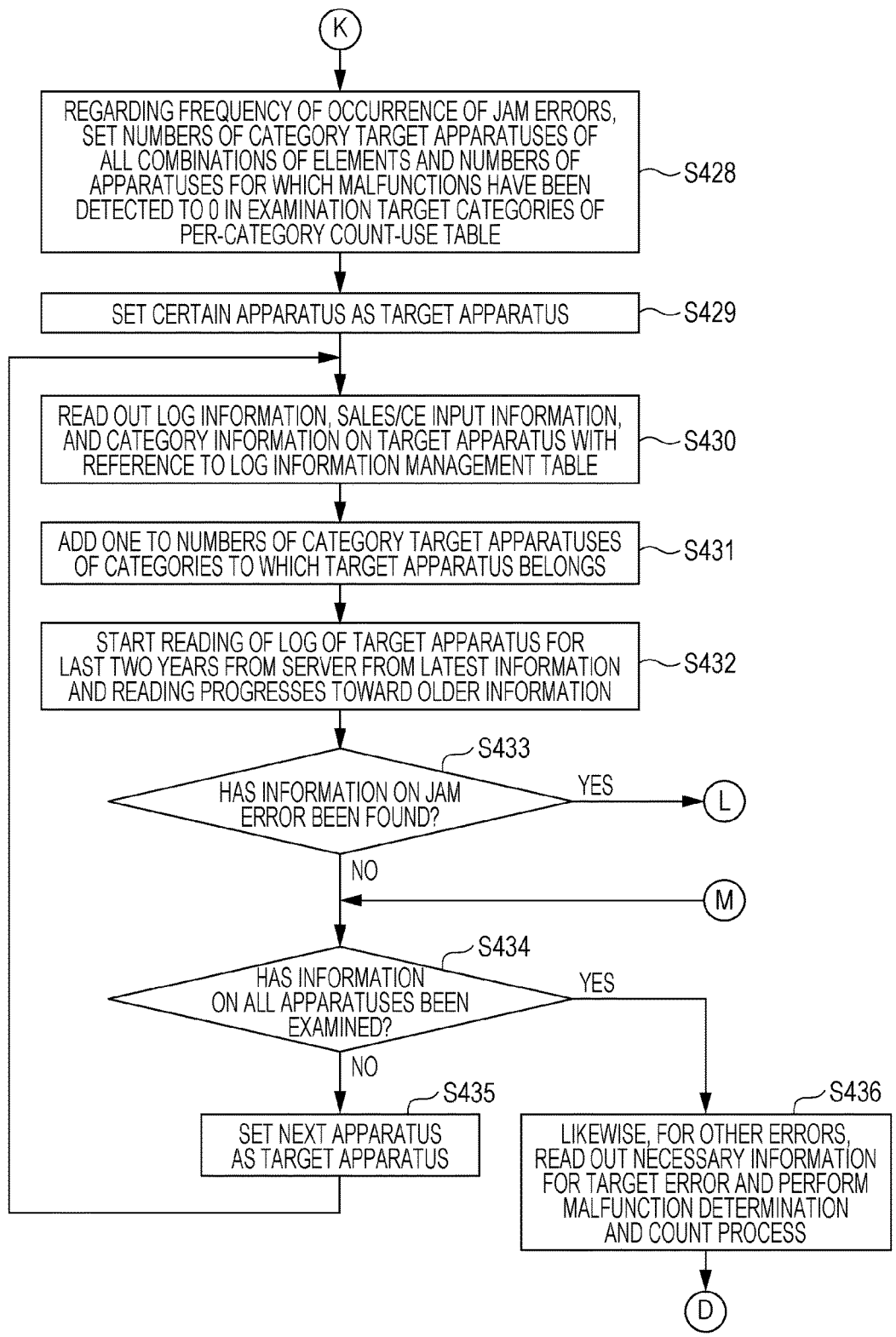
FIG. 8D is a detailed flowchart of FIG. 2.
Figure 8E:
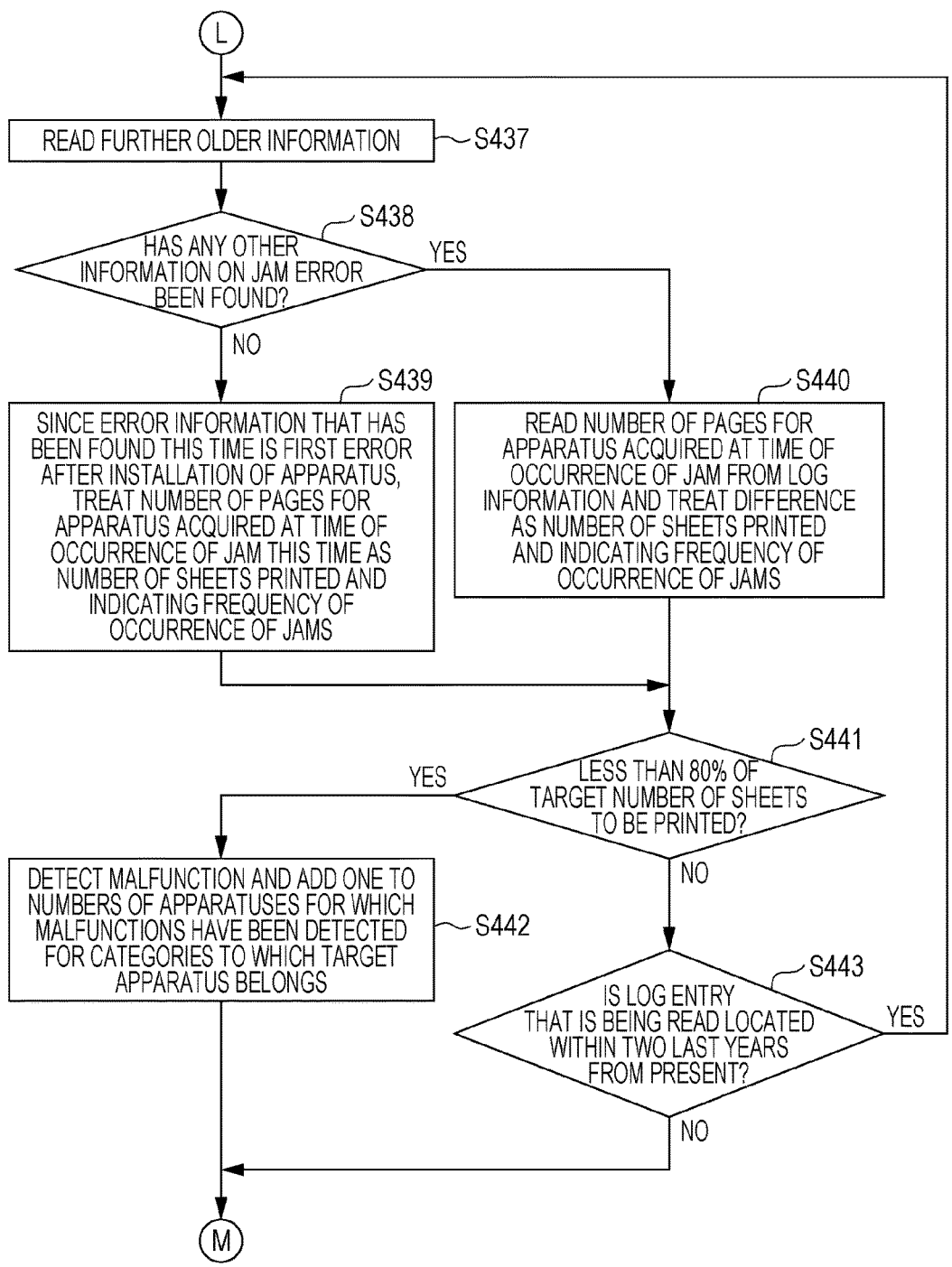
FIG. 8E is a detailed flowchart of FIG. 2.

FIG. 8D and FIG. 8E are a specific example of S303 of FIG. 7, and are a flowchart for counting the number of occurrences of a jam error.

Regarding the frequency of occurrence of jam errors, the classification-calculation unit 1012 initializes the numbers of category target apparatuses of all combinations of the elements and the numbers of apparatuses for which malfunctions have been detected to 0 in examination target categories of the per-category count-use table (S428).

Next, a certain apparatus is set as a target apparatus (S429), log information, sales/CE input information, and category information on the target apparatus are read out with reference to the log information management table (S430), and one is added to the numbers of category target apparatuses of the categories to which the target apparatus belongs (S431).

Next, reading of a log of the target apparatus for the last two years from the server is started from the latest information and progresses toward older information (S432), and it is determined whether or not there is information on a jam error (S433).

In the case where there is no information on a jam error, it is determined whether or not the information on all the apparatuses has been examined (S434). In the case where the information on all the apparatuses has not yet been examined, the next apparatus is set as a target apparatus (S435), and the process in and after S430 is repeated. In the case where the information on all the apparatuses has been examined, for other errors, necessary information for a target error is likewise read out, and a malfunction determination and a count process are performed (S436).

In contrast, in the case where there is information on a jam error, the process proceeds to FIG. 8E. A further older portion of the log is read (S437), and it is determined whether or not there is any other information on a jam error (S438).

In the case where there is no other information on a jam error, since error information that has been found this time is the first error after installation of the apparatus, the number of pages for the apparatus acquired at the time of occurrence of the jam this time is treated as the number of sheets printed and indicating the frequency of occurrence of jams (S439).

In the case where there is any other information on a jam error, the number of pages for the apparatus acquired at the time of occurrence of the jam is read from the log information, and the difference between the numbers of the pages for the apparatus acquired this time and the last time is treated as the number of sheets printed and indicating the frequency of occurrence of jams (S440).

After the number of sheets printed is set in S439 or S440, it is determined whether or not the number of sheets printed is less than 80% of the target number of sheets to be printed (S441). In the case where the number of sheets printed is less than 80% of the target number of sheets to be printed, a malfunction is detected and one is added to the numbers of apparatuses for which malfunctions have been detected for the categories to which the target apparatus belongs (S442). In the case where the number of sheets printed is greater than or equal to 80% of the target number of sheets printed, a malfunction is not detected, and it is determined whether or not the log entry that is being read is located within the last two years from the present (S443). In the case where the log entry is located within the last two years, the process in and after S437 is repeated. In the case where the log entry is older than two years ago, the process in and after S434 of FIG. 8D is repeated.

As described above, for each error, the numbers of occurrences of the error are counted and added to the per-category count-use table.

Figure 8F:
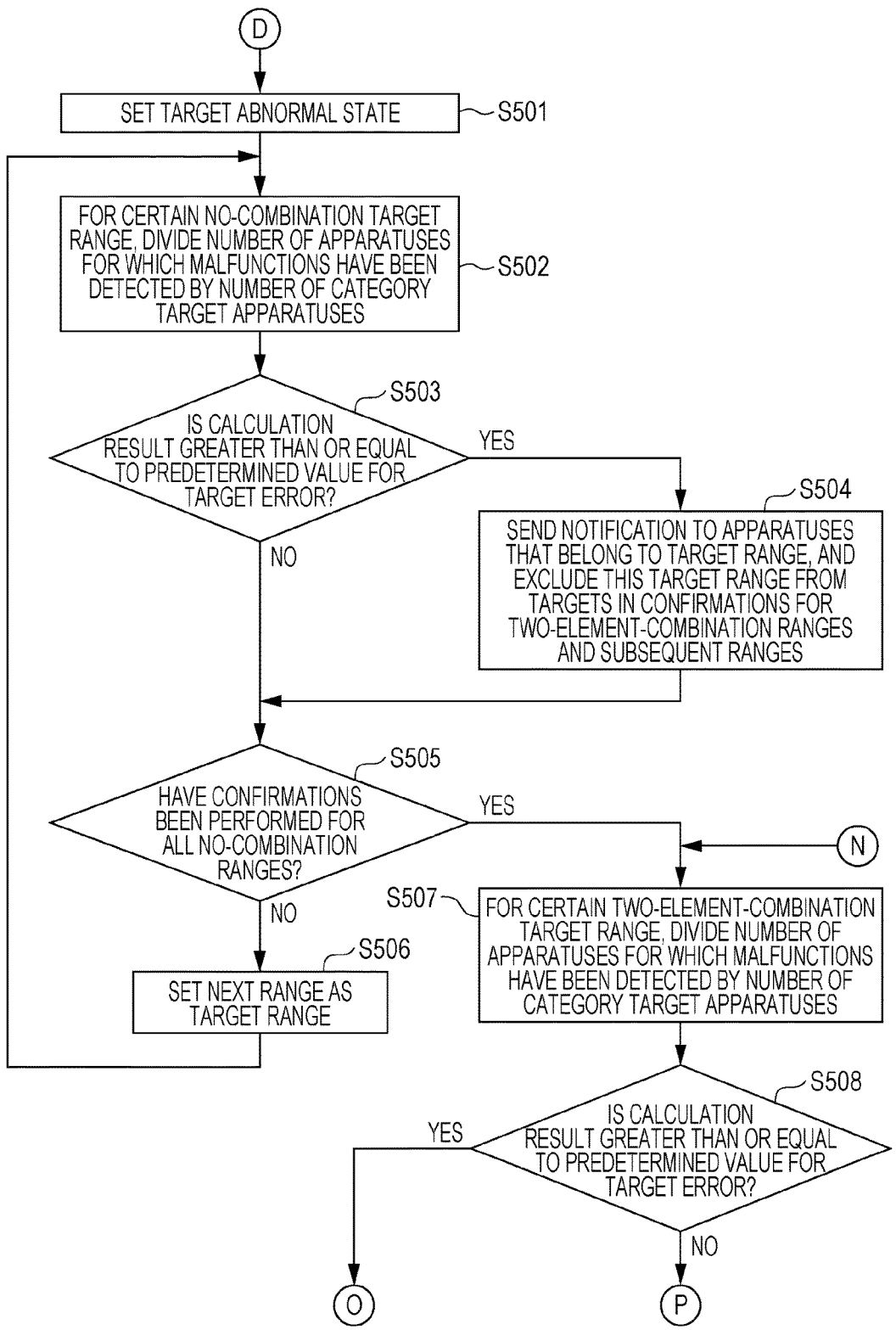
FIG. 8F is a detailed flowchart of FIG. 2.
Figure 8G:
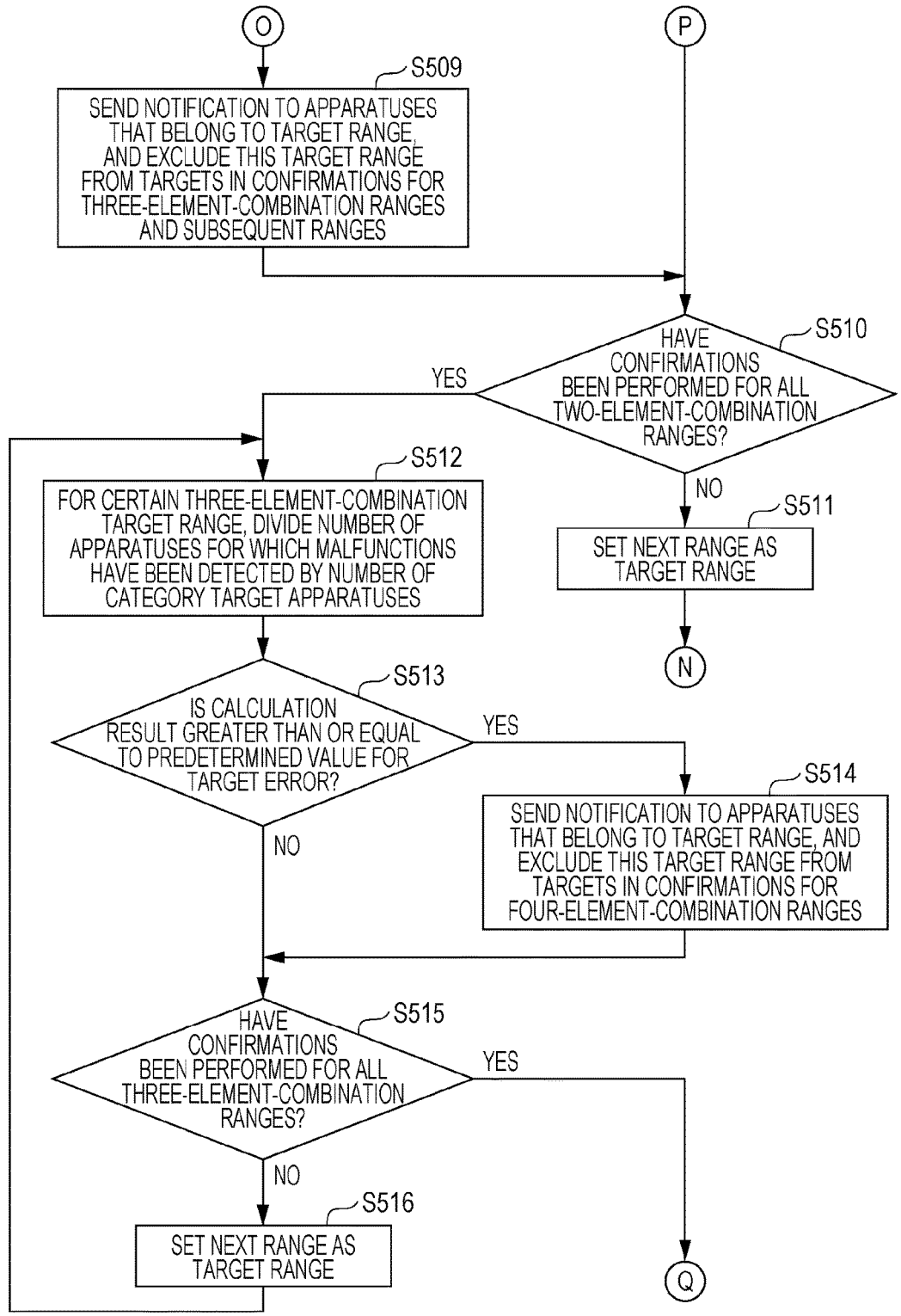
FIG. 8G is a detailed flowchart of FIG. 2.
Figure 8H:
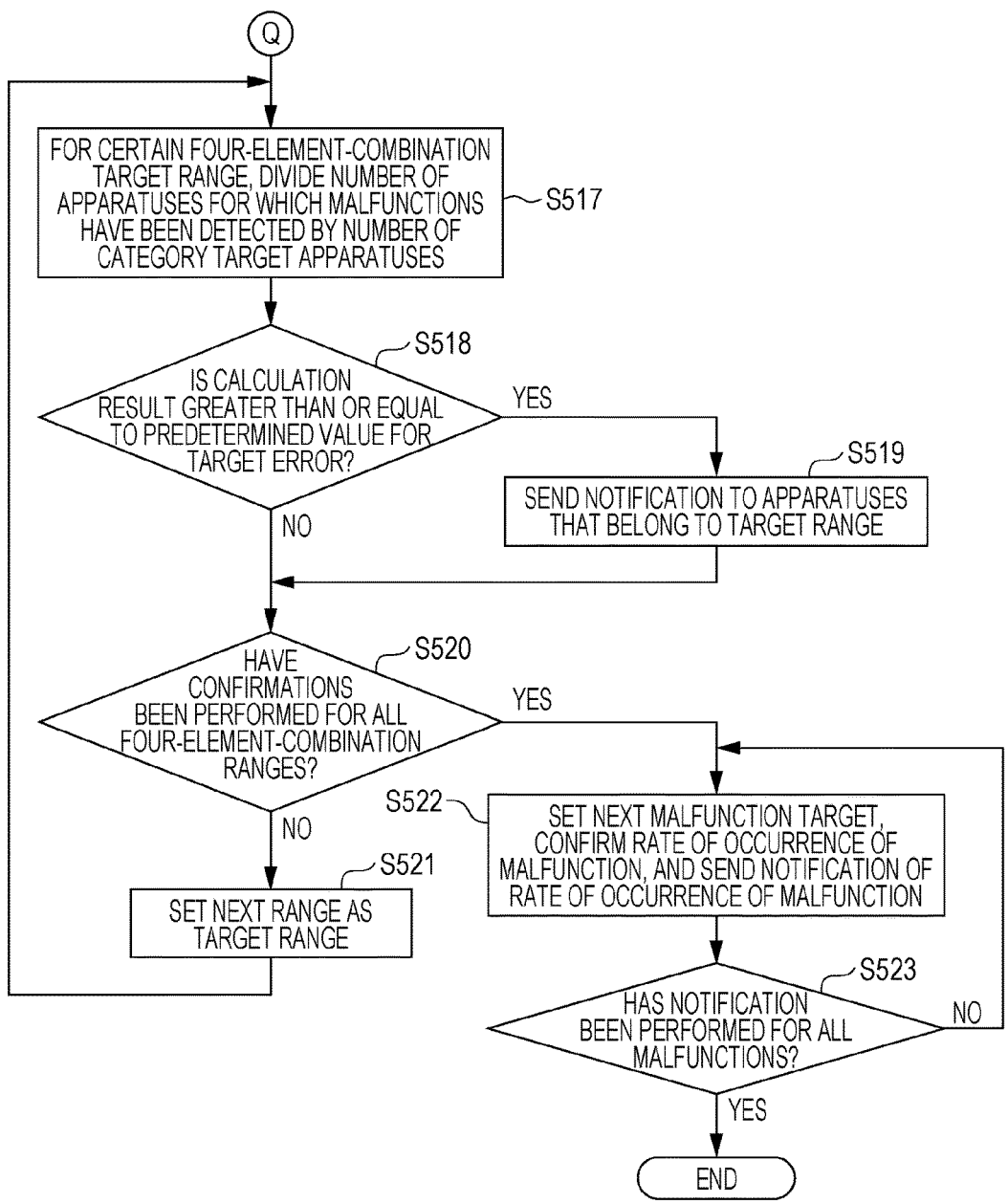
FIG. 8H is a detailed flowchart of FIG. 2.

FIG. 8F, FIG. 8G, and FIG. 8H are a detailed flowchart of processing in S103 of FIG. 3, that is, malfunction detection and notification. As an example, a case of malfunction detection for a photoconductor drum will be described.

The notification unit 1013 sets a target abnormal state (S501). For a photoconductor drum, an abnormal state corresponds to the end of the life of the photoconductor drum.

Next, for a certain no-combination (individual) target range, (the number of apparatuses for which malfunctions have been detected)/(the number of category target apparatuses) is calculated (S502). No-combination (individual) ranges include "Japan A", "clean room available", and the like.

Then, it is determined whether or not the calculation result is greater than or equal to a predetermined value for a target error (S503). In the case where the calculation result is greater than or equal to the predetermined value, a notification is sent to the apparatuses that belong to the target range (S504). In addition, to avoid duplicate notification, this target range is excluded from targets in confirmations for two-element-combination ranges and subsequent ranges. In the case where the calculation result is less than the predetermined value, it is determined whether or not confirmations have been performed for all the no-combination ranges (S505). In the case where confirmations have not yet been performed for all the no-combination ranges, the next range is set as a target range (S506), and the process in and after S502 is repeated. In the case where confirmations have been performed for all the no-combination ranges, next, for a certain two-element-combination target range, (the number of apparatuses for which malfunctions have been detected)/(the number of category target apparatuses) is calculated (S507). Two-element-combination ranges are, for example, "Japan B & clean room available" and the like.

Then, similarly to as in the case of no-combination (individual) ranges, it is determined whether or not the calculation result is greater than or equal to the predetermined value for the target error (S508). In the case where the calculation result is greater than or equal to the predetermined value, the process proceeds to FIG. 8G, and a notification is sent to the apparatuses that belong to the target range (S509). In addition, this target range is excluded from targets in confirmations for three-element-combination ranges and subsequent ranges. In the case where the calculation result is less than the predetermined value, the process proceeds to FIG. 8G, and it is determined whether or not confirmations have been performed for all the two-element-combination ranges (S510). In the case where confirmations have not yet been performed for all the two-element-combination ranges, the next range is set as a target range and the process is repeated (S511). In the case where confirmations have been performed for all the two-element-combination ranges, next, for a certain three-element-combination target range, (the number of apparatuses for which malfunctions have been detected)/(the number of category target apparatuses) is calculated (S512). An example of three-element-combination ranges is "Japan B & no clean room & newspaper".

Then, it is determined whether or not the calculation result is greater than or equal to the predetermined value for the target error (S513). In the case where the calculation result is greater than or equal to the predetermined value, a notification is sent to the apparatuses that belong to the target range (S414). In addition, this target range is excluded from targets in confirmations for four-element-combination ranges. In the case where the calculation result is less than the predetermined value, it is determined whether or not confirmations have been performed for all the three-element-combination ranges (S51). In the case where confirmations have not yet been performed for all the three-element-combination ranges, the next range is set as a target range and the process is repeated (S506). In the case where confirmations have been performed for all the three-element-combination ranges, the process proceeds to FIG. 8H.

In FIG. 8H, for a certain four-element-combination target range, (the number of apparatuses for which malfunctions have been detected)/(the number of category target apparatuses) is calculated (S507).

Then, it is determined whether or not the calculation result is greater than or equal to the predetermined value for the target error (S508). In the case where the calculation result is greater than or equal to the predetermined value, a notification is sent to the apparatuses that belong to the target range (S509). In the case where the calculation result is less than the predetermined value, it is determined whether or not confirmations have been performed for all the four-element-combination ranges (S50). In the case where confirmations have not yet been performed for all the four-element-combination ranges, the next range is set as a target range and the process is repeated (S501). In the case where confirmations have been performed for all the four-element-combination ranges, the next target malfunction is set and the rate of occurrence of the malfunction is likewise confirmed. In the case where the rate of occurrence of the malfunction is greater than or equal to a predetermined value, a notification is sent to the apparatuses that belong to the target range (S422). In the case where notification has been performed for all malfunctions, the process ends (S503).

Note that in the process of FIG. 8F to FIG. 8H, a predetermined value may be adaptively set in accordance with a target error. For example, in the case of the life of the photoconductor drum, a predetermined value is set to 20% or the like.

FIG. 9 illustrates a specific example of the process of FIG. 8F to FIG. 8H. Suppose a situation where there are many apparatuses having photoconductor drums the life of each of which becomes shorter than its useful life because of high temperatures and humidities. In addition, suppose that a predetermined value is set to 20%. In FIG. 9, the rates of occurrence for all categories are expressed as percent. Here, the rate of occurrence of malfunctions={the number of apparatuses for which malfunctions have been detected}/the number of category target apparatuses.

Since the rate of occurrence of malfunctions for a category, India A region & no clean room, is greater than or equal to 20%, all the apparatuses belonging to this category are notified of the possibility of a malfunction. In this case, although the rate of occurrence of malfunctions for a category corresponding to "India A region & no clean room" and further to "newspaper & printing large number of pages" and the rates of occurrence for a category corresponding to "India A region & no clean room" and further to "document printing" are less than 20%, a notification is sent for the category "India A region & no clean room". The details of the notification is freely determined. An example of such a notification is "In the case of no clean room in India A region, the life of the photoconductor drum tends to be shorter, so please pay attention".

In addition, although the rates of occurrence of malfunctions for categories such as a category corresponding to "India A region & no clean room" and further to "newspaper & #1 occasionally large amount of pages" exceed 20%, malfunction detection and notification are performed for the category "India A region & no clean room". Thus, for categories for which more elements are combined, duplicate notification is not performed.

In addition, since the rate of occurrence of malfunctions is also greater than or equal to 20% for a category corresponding to "Japan B region & no clean room" and further to "#1 occasionally large amount of pages", all the apparatuses belonging to this category are notified of the possibility of a malfunction.

Likewise, since the rate of occurrence of malfunctions is also greater than or equal to 20% for a category corresponding to "Japan B region & no clean room" and further to "newspaper & others", all the apparatuses belonging to this category are notified of the possibility of a malfunction.

In this manner, the notification unit 1013 calculates the rates of occurrence of malfunctions for respective categories and notifies all apparatuses of the possibility of a malfunction, all the apparatuses belonging to categories whose rates of occurrence of malfunctions are greater than or equal to a predetermined value. In the case where environment information may be acquired from an environment sensor installed inside a certain apparatus or near the apparatus, category classification may also be performed using the acquired environment information.

For example, a temperature sensor and a humidity sensor are installed on the outside of a printer, and information from these sensors is recorded in a log. Classification is performed using such information into categories: normal (as specified), high temperatures and humidities, high temperatures and low humidities, low temperatures and high humidities, and low temperatures and humidities. For an error that relatively tends to occur such as a jam, classification may also be performed into categories obtained by combining region, environment information, and type of industry. The details of a notification is "In the case where the target number of sheets to be printed is greater than or equal to XI under an environment of high temperatures and humidities, the life of the photoconductor drum tends to be shorter, so please pay attention".

Note that even in the case where no environment sensors are installed, category classification may also be performed using monthly information such as January information, February information, . . . , and December information instead of environment information. As a result, even in the case where environment sensors are not installed, the effect of seasons and the like may be determined. The effects of periodical factors and the effect of human factors may also be determined by using monthly information. An example of a notification using monthly information is "In the case where the target number of sheets to be printed is greater than or equal to BY in June and July, the life of the photoconductor drum tends to be shorter, so please pay attention".

Printers are examples of malfunction notification target apparatuses in the present exemplary embodiment; however, the malfunction notification target apparatuses are not limited to printers and may also be other apparatuses such as multifunctional machines, scanners, FAXES, and the like.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   at least one hardware processor configured to implement:
   acquiring history information and attribute information on a plurality of apparatuses;
   classifying the apparatuses into a plurality of categories in accordance with the attribute information on the apparatuses;
   calculating degrees of occurrence of malfunctions for apparatuses of the categories in accordance with the acquired history information, the degrees of occurrence of malfunctions being calculated for respective categories, into which classification has been performed; and
   notifying a first apparatus of the apparatuses of a possibility of occurrence of malfunctions in response to determining that the first apparatus belongs to a category for which the calculated degree of occurrence of malfunctions of a second apparatus of the apparatuses exceeds a threshold,
   wherein the attribute information comprises installation locations, environmental conditions at the installation locations and types of industries,
   wherein the history information comprises operation statuses and a history of errors, and
   wherein the first apparatus and the second apparatus are classified into the category by determining any of matching history information and matching attribute information between the first apparatus and the second apparatus.

2. An information processing apparatus comprising:
at least one hardware processor configured to implement:
  acquiring history information and attribute information on a plurality of apparatuses;
  classifying the apparatuses into a plurality of categories in accordance with the attribute information on the apparatuses;
  calculating degrees of occurrence of malfunctions for apparatuses of the categories in accordance with the acquired history information, the degrees of occurrence of malfunctions being calculated for respective categories, into which classification has been performed; and
  notifying a first apparatus of the apparatuses of a possibility of occurrence of malfunctions in response to determining that the first apparatus belongs to a category for which the calculated degree of occurrence of malfunctions of a second apparatus of the apparatuses exceeds a threshold,
  wherein the category comprises an indication whether the first apparatus and the second apparatus are installed in respective clean rooms, and
  wherein the notifying the first apparatus of the possibility of occurrence of malfunctions further comprises determining that at least the second apparatus is in a first country and is not installed in any clean room and that the first apparatus is in a second country and is also not installed in any clean room, and
  wherein the classifying the apparatuses further comprises determining whether any clean room is an installation location and also whether any clean room is available as the installation location.

* * * * *